United States Patent
Yuan et al.

(10) Patent No.: US 10,594,154 B2
(45) Date of Patent: Mar. 17, 2020

(54) BATTERY CHARGING METHOD

(71) Applicant: NIO CO., LTD., Shanghai (CN)

(72) Inventors: Shengjie Yuan, Shanghai (CN); Fei Shen, Shanghai (CN); Xiaojia Deng, Shanghai (CN); Yong Yang, Shanghai (CN); Jia Xu, Shanghai (CN)

(73) Assignee: NIO CO., LTD., Shanghai (CN)

( * ) Notice: Subject to any disclaimer, the term of this patent is extended or adjusted under 35 U.S.C. 154(b) by 2 days.

(21) Appl. No.: 15/975,880

(22) Filed: May 10, 2018

(65) Prior Publication Data

US 2018/0331554 A1    Nov. 15, 2018

(30) Foreign Application Priority Data

May 10, 2017    (CN) .......................... 2017 1 0325032

(51) Int. Cl.
*H02J 7/00*    (2006.01)
*H01M 10/44*    (2006.01)

(52) U.S. Cl.
CPC .......... *H02J 7/0078* (2013.01); *H01M 10/44* (2013.01); *H02J 7/0029* (2013.01); *H02J 7/0083* (2013.01); *H02J 2007/0039* (2013.01)

(58) Field of Classification Search
CPC . H02J 7/0078; H02J 7/0083; H02J 2007/0039
USPC .......................... 320/133, 134, 149, 157, 162
See application file for complete search history.

(56) References Cited

U.S. PATENT DOCUMENTS

| | | | |
|---|---|---|---|
| 2006/0089733 A1* | 4/2006 | Dickinson | B60L 3/12 700/83 |
| 2016/0046199 A1* | 2/2016 | Butler | H02J 7/0004 320/106 |

* cited by examiner

*Primary Examiner* — Edward Tso
*Assistant Examiner* — Aaron Piggush
(74) *Attorney, Agent, or Firm* — Sheridan Ross P.C.

(57) ABSTRACT

The present application relates to a battery charging method. The method comprises the steps of: in accordance to the current's adverse effect on battery lifespan, classifying the charging current of a battery into a first type of charging current and a second type of charging current; setting a proportion limit on the first type of charging current and a proportion limit on the second type of charging current; obtaining the historical charging current information of the battery; determining the historical accumulative proportion of the second type of charging current in accordance to the historical charging current information; in accordance to the proportion limits and the historical accumulative proportion, determining the type of battery charging current which is present available. By taking into account different charging currents' adverse effect on battery lifespan, the charging method solves the problem of excessive charging current's adverse effect on battery lifespan.

19 Claims, 5 Drawing Sheets

| Current type (preset charging current) | Proportion limit | Historical accumulative proportion | Present available charging current |
|:---:|:---:|:---:|:---:|
| 0.5C | 100% | 69.5% | √ |
| 1C | 20% | 15.5% | √ |
| 1.5C | 15% | 15% | x |

Fig.1

| Current type (preset charging current) | Proportion limit |
|---|---|
| I | 100% |
| II | a% |
| III | b% |

Fig.2

| Current type (preset charging current) | Proportion limit | Historical accumulative proportion | Present available charging current |
|---|---|---|---|
| 0.5C | 100% | 69.5% | √ |
| 1C | 20% | 15.5% | √ |
| 1.5C | 15% | 15% | x |

BATTERY CHARGING METHOD

CROSS-REFERENCE TO RELATED APPLICATIONS

This application claims the benefit of Chinese Patent Application No. 201710325032.2 filed May 10, 2017, the entire contents of which are incorporated herein by reference.

TECHNICAL FIELD

The present application relates to the field of battery charging, particularly to a battery charging method.

BACKGROUND

The usable energy and power that can be provided by a fully charged battery pack reduces over service time, the damping rate is influenced by the battery pack's working conditions, such as a charging current, a discharging current, temperature and the SOC range in which the battery supplies power to the vehicle. The charging current is the most important factor to impact the battery pack lifespan.

Energy-supplementing of electric vehicle power battery is mainly realized by battery charging or battery replacing. Taking battery replacing as an example, the power battery shorting of electrical energy on an electric vehicle will be replaced by a fully charged battery at an electric vehicle battery swapping station and then charged at the station when the vehicle needs to be supplemented with electric energy. During the charging process of electric vehicle power battery at the swapping station, both the charging efficiency (the power battery is fully charged over a short period of time) and the lifespan of the power battery require to be free from adverse effect.

However, at the existing swapping stations, power batteries are charged within a short period of time mostly by means of a heavy charging current.

Accordingly, there is a need for a new battery charging method to resolve the previously mentioned problem.

SUMMARY

To resolve the above problem in the art, i.e., an excessive charging current will adversely affect battery lifespan especially when an electric vehicle power battery is charged at a swapping station, the present application provides a battery charging method comprising the following steps: according to the current's adverse effect on battery lifespan, classifying a charging current for a battery into a first type of charging current and a second type of charging current; setting a proportion limit on the first type of charging current and a proportion limit on the second type of charging current; before the battery is charged, obtaining historical charging current information of the battery; determining the historical accumulative proportion of the second type of charging current in accordance to the historical charging current information; in accordance to the proportion limits and the historical accumulative proportion, determining a present available battery charging current, wherein the proportion limit refers to a proportion of the maximum of battery charging time by its respective type of charging current divided by the overall number of battery charging time during its lifespan, or a proportion of the maximum of battery charging duration by its respective type of charging current divided by the overall battery charging duration during its lifespan.

In a preferred technical solution of the previously mentioned charging method, the second type of charging current comprises multiple preset charging currents; and the step of setting a proportion limit on the first type of charging current and a proportion limit on the second type of charging current further comprises: the proportion limit on the first type of charging current is set to 100%; and in accordance to the current's adverse effect on battery lifespan, the multiple preset charging currents are respectively assigned different proportion limits.

In a preferred technical solution of the previously mentioned charging method, the step of determining the historical accumulative proportion of the second type of charging current in accordance to the historical charging current information further comprises: determining the historical accumulative proportion of each of the preset charging current in accordance to the historical charging current information of the battery.

In a preferred technical solution of the previously mentioned charging method, the historical accumulative proportion of charging current for each of the preset charging current refers to a proportion of the historical charging number by the preset charging current divided by the overall historical charging number, or a proportion of the historical charging duration of the preset charging current divided by the overall historical charging duration.

In a preferred technical solution of the previously mentioned charging method, the step of obtaining the historical charging current information of the battery further comprises: obtaining the historical charging current information of the battery with the aid of a battery management system or a server.

In a preferred technical solution of the previously mentioned charging method, the step of determining the present available battery charging current further comprises: when the historical accumulative proportion of a preset charging current is smaller than its respective proportion limit, the preset charging current serves as the present available battery charging current; and when the historical accumulative proportion of a preset charging current is greater than its respective proportion limit, the preset charging current is prohibited to be used as the present available battery charging current.

In a preferred technical solution of the previously mentioned charging method, prior to determining the present available battery charging current, the battery charging method also comprises the steps of: obtaining an ideal relationship curve indicating the relationship between an accumulative output energy of the battery and a working time; obtaining a historical relationship curve indicating the relationship between the accumulative output energy of the battery and the working time; determining a first gradient of the ideal relationship curve at the present time; and determining a second gradient of the historical relationship curve at the present time.

In a preferred technical solution of the previously mentioned charging method, the step of determining the present available battery charging current further comprises: when the value of the second gradient is smaller than that of the first gradient, if the historical accumulative proportion of a preset charging current is smaller than its respective proportion limit, the preset charging current serves as the present available battery charging current, otherwise it is prohibited to be used as the present available battery charging current; and when the value of the second gradient is greater than that of the first gradient, the first charging currents current is only permitted to be used as the present available battery charging current.

In a preferred technical solution of the previously mentioned charging method, the battery is a power battery of electric vehicle.

In a preferred technical solution of the previously mentioned charging method, the step of classifying the charging current of the battery into a first type of charging current and a second type of charging current according to the current's adverse effect on battery lifespan is carried out by means of experiment or mathematical modeling.

In another aspect, the present application provides a memory in which multiple instructions are stored, and these instructions are loaded by a processor and able to perform the steps of the battery charging method as mentioned above.

In yet another aspect, the present application provides a controller comprising a memory in which multiple instructions are stored and a processor used for carrying out these instructions, wherein these instructions are loaded by a processor and able to perform the steps of the battery charging method as mentioned above.

It should be understood by those skilled in the art that, in preferred technical solutions of the present application, according to the current's adverse effect on battery lifespan, obtaining the first type of charging current and the second type of charging current, wherein the proportion limit on the first type of charging current is 100%, that is to say, the battery can be charged with this type of charging current at any time, and the second type of charging current comprises multiple preset charging currents with different proportion limits. The historical accumulative proportion limit of each of the preset charging current is obtained according to the historical charging current information of the battery. The proportion limit of each preset charging current is compared with its respective historical accumulative proportion. Specifically, when the historical accumulative proportion of a preset charging current is smaller than its respective proportion limit, the preset charging current serves as the present available battery charging current; and when the historical accumulative proportion of a preset charging current is greater than its respective proportion limit, the preset charging current is prohibited to be used as the present available battery charging current. By carrying out the above preferred technical solutions, the present application can prevent the battery from being charged by a heavy charging current for a long time, such that the harm did to the battery lifespan by excessive charging current will be avoid to the largest extent.

Further, by obtaining the historical relationship curve and the ideal relationship curve both indicating the relationship between the accumulative output energy and the working time of the battery, the first gradient and the second gradient of the ideal relationship curve and that of the historical relationship curve at the present time are determined. The first gradient of the present time and the second gradient of the present time are compared with each other. Specifically, when the value of the second gradient is smaller than that of the first gradient, it indicates that at the same time point, the actual accumulative output energy of the battery is smaller than its ideal accumulative output energy, and the battery has not been fully discharged. At this point, for the same preset charging current, if the historical accumulative proportion of the same preset charging current is smaller than its respective proportion limit, the preset charging current is allowed to serve as the present available charging current of the battery, otherwise this preset charging current is prohibited to be used as the present available power supply of the battery. On the other hand, when the value of the second gradient is greater than that of the first gradient, it indicates that at the same time point, the actual accumulative output energy of the battery is greater than its ideal accumulative output energy, and the battery has been fully discharged. At this point, the first type of charging current is only permitted to be used as the present available charging current of the battery so as to drastically reduce the damage to battery lifespan caused by the heavy charging current.

In summary, the charging method of the present application has not only resolved the problem of excessive charging current's adverse effect on battery lifespan but also been able to choose a charging current as high as possible based on charging and discharging without impacting the battery's lifespan so as to effectively improve the charging efficiency of the battery.

DETAILED DESCRIPTION

The preferred embodiments of the present application will be described below with reference to the accompanying figures. As will be understood by those skilled in the art, these embodiments are simply used for interpreting the technical principle of the present application and are not intended to limit its protection scope in any way. In the following examples, although the principle of the present application will be explained in conjunction with the power battery of an electric vehicle, the charging method and system, etc. described herein can also be applied to batteries such as an energy storing battery with or without adaptive adjustment. Additionally, it should be noted that, in this application, the charging method and system, etc. can be applied not only to the battery of an electric vehicle but also to the battery of an electric bicycle.

Figure 1:
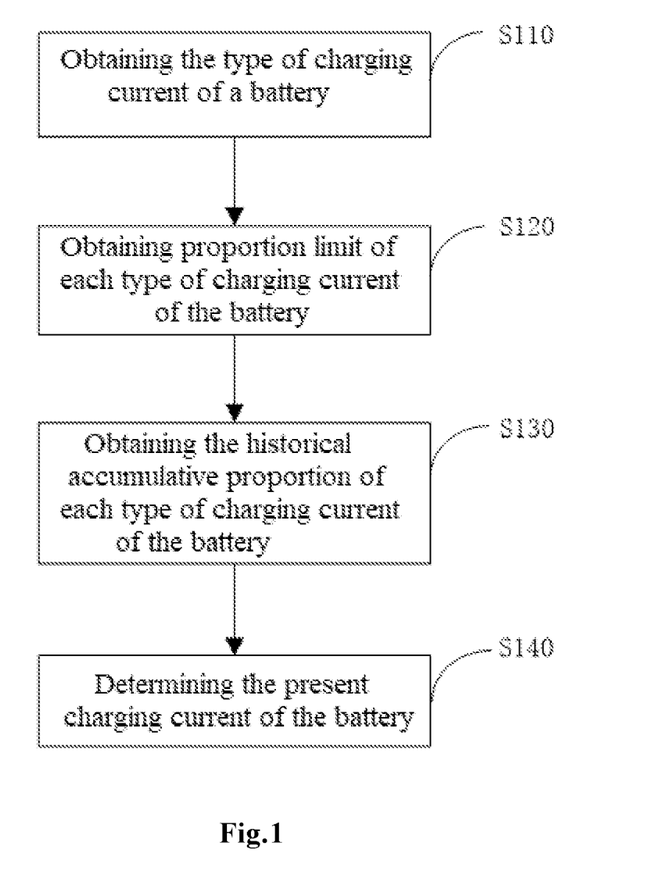
FIG. 1 is a flow chart of the battery charging method according to an example of the present application.

FIG. 1 is a flow chart of a battery charging method according to an example of the present application. In the first place, it should be pointed out that the batteries being charged in this example are of the same model. As shown in FIG. 1, the battery charging method comprises the following steps: step S110, obtaining the type of charging current of a battery; step S120, obtaining the proportion limit on each type of charging current of a battery; step S130, obtaining the historical accumulative proportion on each type of charging current of a battery; and step S140, determining the present available charging current of a battery.

Figure 2:
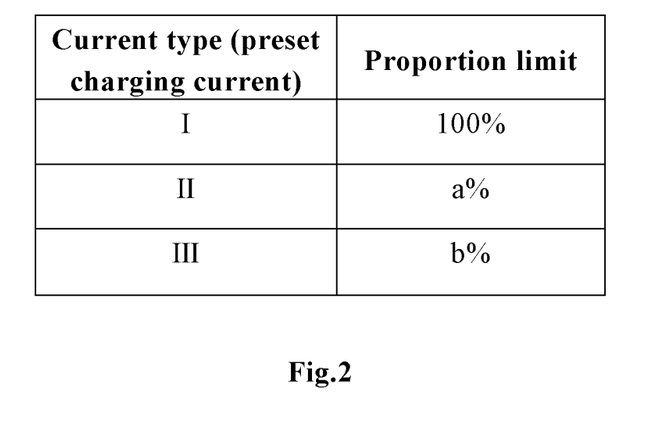
FIG. 2 is an exemplary table in which the typess of charging current and the proportion limits of a battery are shown.

Referring now to FIG. 2, and continued referring to FIG. 1, as shown in FIG. 2, at step S110, the charging current of a battery is classified into different types by means of experiment or mathematical modeling and based on the impact on battery lifespan by values of current. In one feasible embodiment, the charging current of a battery is classified into a first type of charging current and a second type of charging current, wherein the portion of the charging current that has no or little impact on regular damping of a battery is referred to as the first type of charging current (the type I) and the remaining portion is referred to as the second type of charging current. More specifically, the second type of charging current is further divided into multiple preset charging currents (type II and type III shown in FIG. 2) according to its impact on battery damping. As can be understood by those skilled in the art, the classifying of the charging current is not limited to the above mentioned examples. That is, the charging current is classified into the first type of charging current and the second type of charging current, or the second type charging current is specifically divided into type II and type III charging current. In practice, the charging current can be classified more specifically or based on other criteria.

At the step of S120, according to the examples of the present application, the proportion limits on charging current type I, charging current type II and charging current type III are respectively set. Here, the term "proportion limit" refers to a proportion of the maximum of battery charging time by a respective type of charging current divided by the overall number of battery charging time during its lifespan, or a proportion of the maximum battery charging duration of this type of charging current divided by the overall battery charging duration during its lifespan. The proportion limits are obtained with the aid of experiment or mathematical modeling and usually have been determined before leaving factory. With reference to the examples in FIG. 2, the proportion limit on charging current type I is 100%, the proportion limit on charging current type II is a % and the proportion limit on charging current type III is b %. As stated above, charging current type I has little impact on regular damping of a battery and therefore its proportion limit is set to 100%. In other words, a battery can be charged by charging current type I with unlimited number.

Figure 3:
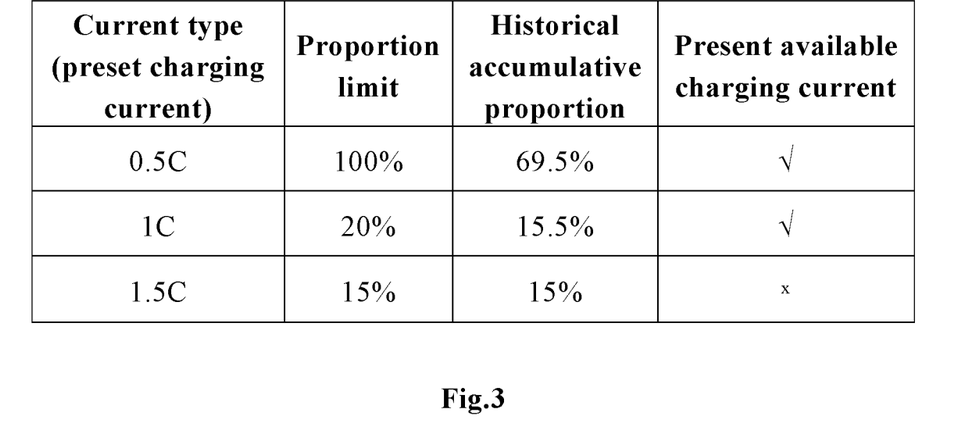
FIG. 3 shows a specific example of the value of each type of current shown in FIG. 2.

FIG. 3 shows specific examples of the value of each type of current shown in FIG. 2. As shown in FIG. 3, in one feasible embodiment, the value of charging current type I of the power battery on an electric vehicle is 0.5 C, the value of charging current type II is 1 C and the value of charging current type III is 1.5 C. According to the examples of the present application, 1 C indicates the rated charging current of the power battery, which is adjustable based on practical applications.

At the step of S130, obtaining the historical accumulative proportion on each type of charging current for the power battery, particularly, with regard to the power battery, obtaining the overall historical number of charging time of the battery and respectively calculating the proportion of the historical accumulative number of charging time of the battery for each current of type I, type II and type III divided by the overall historical number of charging time of the battery, which are the historical accumulative proportion of each charging current type I, type II and type III for the power battery, respectively.

In the examples shown in FIG. 3, the historical accumulative proportions of charging current type I (0.5 C), charging current type II (1 C) and charging current type III (1.5 C) are respectively 69.5%, 15.5% and 15%. That is, the historical charging number of charging current type I (0.5 C), that of charging current type II (1 C) and that of charging current type III (1.5 C) respectively account for 69.5%, 15.5% and 15% of the historical charging number of the power battery.

By way of example, there are two ways of obtaining the historical charging current information of the power battery.

Figure 4:
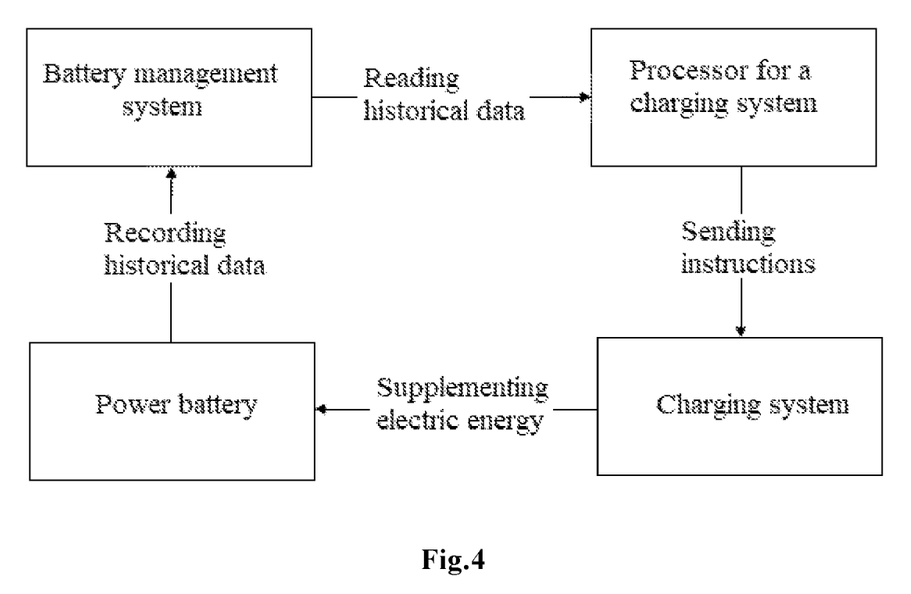
FIG. 4 is an illustration of the system principle based on which the historical data of the battery is obtained by a battery management system.

FIG. 4 is an illustration of the principle of example 1, wherein a battery management system of the power battery records the historical charging current information comprising the historical charging number of a battery, each charging duration and each value of all the charging current of the power battery. Further, when the power battery is charged, the processor of the battery charging system of the power battery reads the historical charging current information of the power battery. As can be understood by those skilled in the art, the charging system may be a charging post, a charging machine or a charging station, and so forth.

Figure 5:
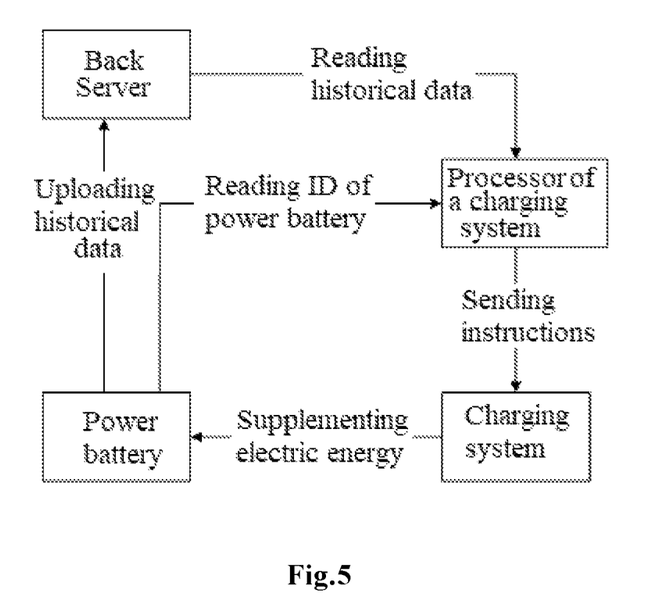
FIG. 5 is an illustration of the system principle based on which the historical data of the battery is obtained by a server.

FIG. 5 is an illustration of the principle of example 2, wherein a server is used to record the historical charging current information of the power battery. When the power battery is charged, the processor of the battery charging system (a processor of a charging station, for example) reads the ID of the power battery and then retrieves the historical charging current information of the power battery from the server on the basis of its ID.

At the step of S140, the historical accumulative proportion of each type of charging current of the power battery obtained at step S130 is compared with its respective proportion limit, so as to acquire the information about the type of the charging current for the power battery which is available for the present charging operation. Specifically, the proportion limits respectively corresponding to the charging current 0.5 C, 1 C and 1.5 C are respectively compared with their historical accumulative proportions, as results of which are the proportion limit of 100% corresponding to the charging current 0.5 C is higher than its respective historical accumulative proportion of 69.5%; the proportion limit of 20% corresponding to its charging current 1 C is higher than the respective historical accumulative proportion of 15.5%; and the proportion limit of 15% corresponding to its charging current 1.5 C equals to its respective historical accumulative proportion of 15%. Therefore, the values of the present available charging current for the power battery are 0.5 C and 1 C. Preferably, the present charging operation employs the charging current of 1 C to ensure the charging efficiency of the power battery.

It should be noted that, when there are multiple present available charging currents for the power battery, it is programmed for the power battery to be charged by a higher charging current in order to shorten the charging duration; or it is programmed for a user to manually choose present charging current for the power battery; or it is programmed for the power battery to be charged by a higher charging current during daytime and by a smaller current at night.

Taking an electric vehicle and a charging post as examples, the battery charging method of the present application is detailed in conjunction with FIG. 3.

When the charging gun on the charging post is inserted by a user into the charging port of the electric vehicle, a communication link between the charging post and the electric vehicle is established. The charging post reads the historical charging data of the power battery on the electric vehicle. As shown in FIG. 3, the charging current of 0.5 C corresponds to the historical accumulative proportion of 69.5%, the charging current of 1 C corresponds to the historical accumulative proportion of 15.5% and the charging current of 1.5 C corresponds to the historical accumulative proportion of 15%.

Further, by comparing each historical accumulative proportion with its respective proportion limit, it is known that the electric vehicle can be charged by the charging current of 0.5 C and/or the charging current of 1 C. The charging post charges the electric vehicle with the charging current of 1 C in order to shorten the charging duration.

Figure 6:
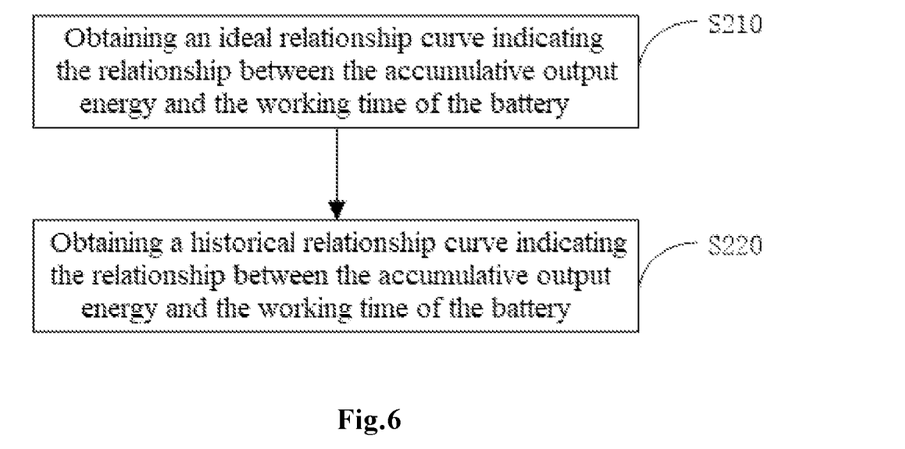
FIG. 6 is a flow chart which is the supplement of the battery charging method shown in FIG. 1.

As shown in FIG. 6, the present application can also comprise an optional step combination of S210 and S220 between step S130 and step 140. Specifically, at the step of S210, the ideal relationship curve indicating the relationship between the accumulative output energy and the working time of the battery is obtained; and at the optional step of S220, the historical relationship curve indicating the relationship between the accumulative output energy and the working time of the battery is acquired.

Figure 7:
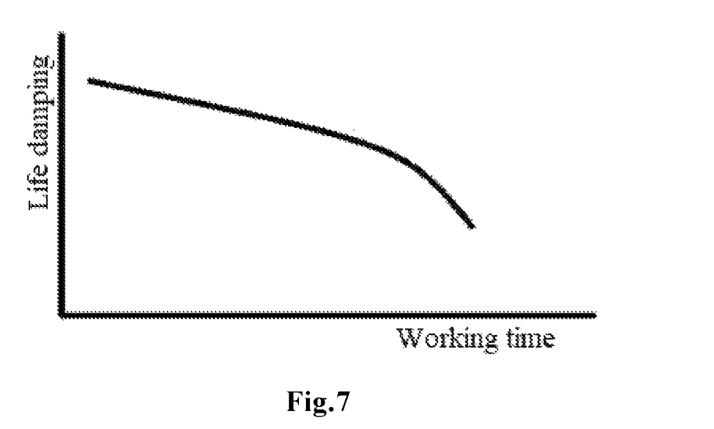
FIG. 7 is a view indicating the relationship between battery damping and working time.

At the optional step S210, the life damping speed of the power battery is obtained by means of experiment or mathematical modeling. As shown in FIG. 7, the life damping speed is shown by the relationship curve which indicates the relationship between the degree of life damping and the working time. It should be understood by those skilled in the art that, the life damping speed of the power battery can be measured in hours, days or weeks. It is not difficult to reach the conclusion from FIG. 6 that the gradient of the life damping speed is variable over time. Multiple representative values of the gradient (for example, K1, K2, K3 and K4 shown in the FIG. 8) are set for the purpose of calculating and observing.

Figure 8:
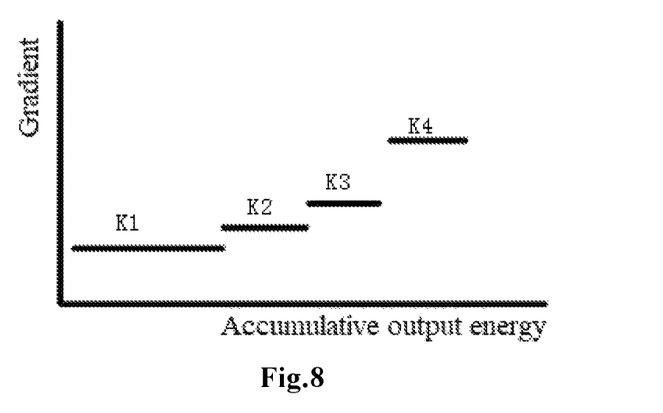
FIG. 8 is a view indicating the relationship between the output energy and the gradient which shows the relationship between battery damping and working time shown in FIG. 7.
Figure 9:
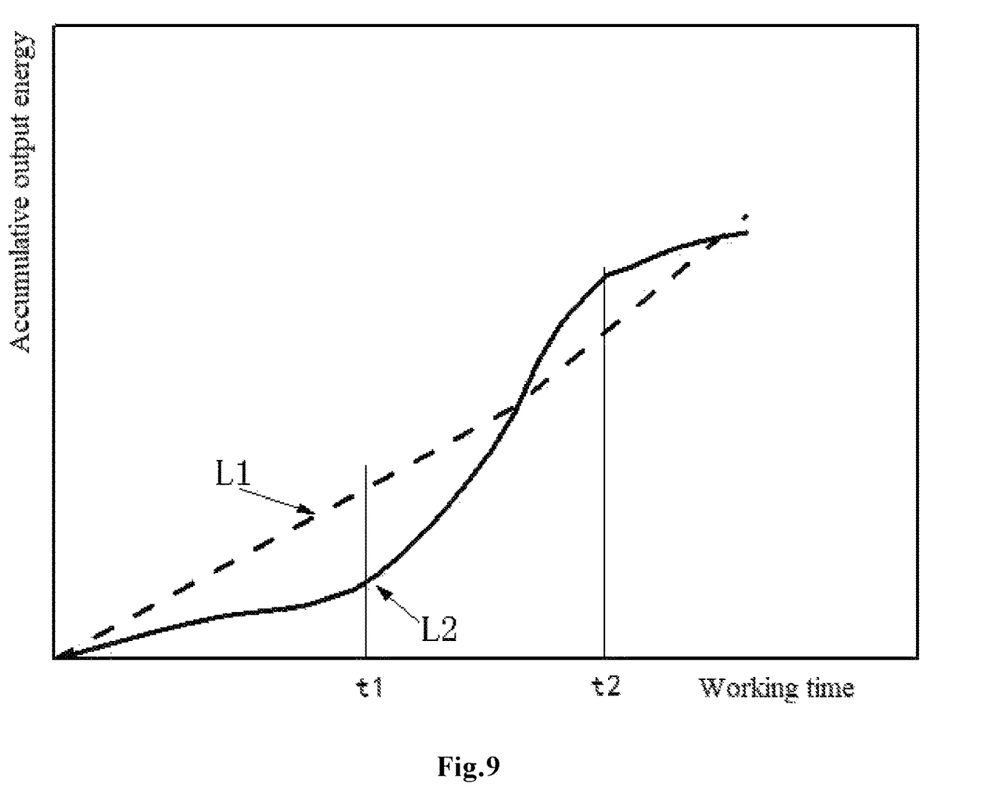
FIG. 9 is a view indicating the relationship between the output energy and its working time of the battery.

Further, the relationship curves shown in the FIGS. 7 and 8 are integrated into the ideal relationship curve L1 indicating the relationship between the accumulative output energy and the working time of the power battery shown in FIG. 9 by means of mathematical models, so as to obtain the first gradient of the ideal relationship curve L1 at the present time. As can be understood by those skilled in the art, the ideal relationship curve can be determined according to various criteria. In a preferred embodiment of the present application, one of these criteria can preferably minimize the life damping speed of the power battery.

At the optional step of S220, firstly, the actual historical accumulative output energy of the power battery is acquired, and then the historical relationship curve L2 indicating the relationship between the working time and the historical accumulative output energy is obtained according to the output energy, finally a second gradient of the historical relationship curve L2 corresponding to the present time is obtained.

As a supplement to the above step S500, the first gradient obtained at step S210 is compared with the second gradient obtained at step S220, and based on the result of the comparison, the type of present available charging current for the power battery is determined. When L1 is below L2, all the preset types of current are able to be used for charging the power battery within the range of the proportion limits of the charging current shown in FIG. 2. When L1 is above L2, only the type of current with the proportion limit of 100% is allowed to be used for charging the power battery. Particularly, when the value of the second gradient is smaller than that of the first gradient (as shown in FIG. 9, at time t1, the accumulative output energy corresponding to L1 is more than that of L2), it indicates that at the same time point, the actual accumulative output energy of the battery is smaller than its ideal accumulative output energy and the battery has not been fully discharged. At this point, for the same preset type of charging current, if its historical accumulative proportion is smaller than the respective proportion, the preset type of charging current is allowed to serve as the present available power supply of the power battery, otherwise the preset type of charging current is prohibited to be used as the present available power supply of the power battery. And when the value of the second gradient is greater than that of the first gradient (as shown in FIG. 9, at time t2, the accumulative output energy corresponding to L1 is less than that of L2), it indicates that at the same time point, the actual accumulative output energy of the battery is more than its ideal historical accumulative output energy, and the battery has been fully discharged. At this point, only the first type of charging current can be used as the present available charging current of the power battery.

In summary, the charging method of the present application has not only resolved the problem of adverse effect on battery lifespan caused by excessive charging current, but also been able to choose the charging current as high as possible based on charging and discharging without impacting the working life of the power battery so as to effectively improve the charging efficiency of the battery.

On the other hand, the present application provides a controller comprising a memory in which multiple instructions are stored and a processor used for carrying out these instructions. By carrying out these instructions, steps S110 to S140 and steps S210 to S220 are performed. By way of example, an instruction can execute either one or more than one step, or one step can be completed by one or more than one instruction, and these instructions are carried out in the sequence of from the step S110 to the step S140 and from the step S210 and to the step S220. For example, the controller can be provided into the charging post described above. When the vehicle needs to be charged, the controller is able to communicate with the vehicle in a wired or wireless manner and carry out the instructions stored in the memory to perform the previously mentioned method, such that a suitable way of charging the vehicle is determined.

So far, the technical solutions of the present application have been described with reference to the preferred embodiments shown in the accompanying figures. As will be appreciated by those skilled in the art, however, these specific embodiments are not intended to limit protection scope of the application. It will be understood by those skilled in the art that, without departing from the principle of the invention, various changes may be made and equivalents may be substituted for related technical features, the varied or substituted technical solutions will fall within the protection scope of the application.

What is claimed is:
1. A battery charging method comprising:
according to a current's adverse effect on battery lifespan, classifying the charging current of a battery into a first type of charging current and a second type of charging current;

setting a proportion limit on the first type of charging current and a proportion limit on the second type of charging current;

before the battery is charged, obtaining a historical charging current information of the battery;

determining a historical accumulative proportion of the second type of charging current in accordance with the historical charging current information;

in accordance with the proportion limits and the historical accumulative proportion, determining the battery charging current which is presently available;

wherein the proportion limit refers to a proportion of the maximum of charging time of the battery by its respective current divided by the overall number of battery charging time during its lifespan, or a proportion of the maximum of battery charging duration of its respective current divided by the overall battery charging duration during its lifespan.

2. The battery charging method as set forth in claim 1, wherein the second type of charging current comprises multiple preset charging current; and setting the proportion limit on the first type of charging current and the proportion limit on the second type of charging current further comprises:

setting the proportion limit on the first type of charging current to 100%; and in accordance with the current's adverse effect on battery lifespan, respectively assigning different proportion limits to the multiple preset charging current.

3. The battery charging method as set forth in claim 2, wherein determining the historical accumulative proportion of the second type of charging current in accordance with the historical charging current information further comprises:

determining the historical accumulative proportion of each preset charging current in accordance with the historical charging current information of the battery.

4. The battery charging method as set forth in claim 3, wherein the historical accumulative proportion of charging current for each of the preset charging current refers to a proportion of the historical charging number by the preset charging current divided by the overall historical charging number, or a proportion of the charging duration of this type of charging current divided by the overall historical charging duration.

5. The battery charging method as set forth in claim 4, wherein obtaining the historical charging current information of the battery further comprises: obtaining the historical charging current information of the battery with the aid of a battery management system or a server.

6. The battery charging method as set forth in claim 2, wherein determining the presently available battery charging current further comprises:

when the historical accumulative proportion of a preset charging current is smaller than its respective proportion limit, the preset charging current serves as the presently available battery charging current; and when the historical accumulative proportion of a preset charging current is greater than its respective proportion limit, the preset charging current is prohibited to be used as the presently available battery charging current.

7. The battery charging method as set forth in claim 2, wherein prior to determining the presently available battery charging current, the battery charging method also comprises:

obtaining the ideal relationship curve indicating the relationship between the accumulative output energy of the battery and the working time;

obtaining the historical relationship curve indicating the relationship between the accumulative output energy of the battery and the working time;

determining a first gradient of the ideal relationship curve corresponding to the present time; and determining a second gradient of the historical relationship curve corresponding to the present time.

8. The battery charging method as set forth in claim 7, wherein determining the presently available battery charging current further comprises:

when the value of the second gradient is smaller than that of the first gradient, if the historical accumulative proportion of a preset charging current is smaller than its respective proportion limit, the preset charging current serves as the presently available battery charging current, otherwise it is prohibited to be used as the presently available battery charging current; and when the value of the second gradient is greater than that of the first gradient, the first kind of charging current is only permitted to be used as the presently available battery charging current.

9. The battery charging method as set forth in claim 1, wherein the battery is a power battery of electric vehicle.

10. A memory in which multiple instructions are stored, wherein the instructions are loaded by a processor and able to perform the battery charging method as set forth in claim 1.

11. A controller comprising a memory in which multiple instructions are stored and a processor used for carrying out the instructions, wherein the instructions are loaded by the processor to perform the battery charging method as set forth in claim 1.

12. The battery charging method as set forth in claim 3, wherein determining the presently available battery charging current further comprises:

when the historical accumulative proportion of a preset charging current is smaller than its respective proportion limit, the preset charging current serves as the presently available battery charging current; and when the historical accumulative proportion of a preset charging current is greater than its respective proportion limit, the preset charging current is prohibited to be used as the presently available battery charging current.

13. The battery charging method as set forth in claim 4, wherein determining the presently available battery charging current further comprises:

when the historical accumulative proportion of a preset charging current is smaller than its respective proportion limit, the preset charging current serves as the presently available battery charging current; and when the historical accumulative proportion of a preset charging current is greater than its respective proportion limit, the preset charging current is prohibited to be used as the presently available battery charging current.

14. The battery charging method as set forth in claim 5, wherein determining the presently available battery charging current further comprises:

when the historical accumulative proportion of a preset charging current is smaller than its respective proportion limit, the preset charging current serves as the presently available battery charging current; and when the historical accumulative proportion of a preset charging current is greater than its respective proportion limit, the preset charging current is prohibited to be used as the presently available battery charging current.

15. The battery charging method as set forth in claim 3, wherein prior to determining the presently available battery charging current, the battery charging method also comprises:
- obtaining the ideal relationship curve indicating the relationship between the accumulative output energy of the battery and the working time;
- obtaining the historical relationship curve indicating the relationship between the accumulative output energy of the battery and the working time;
- determining a first gradient of the ideal relationship curve corresponding to the present time; and
- determining a second gradient of the historical relationship curve corresponding to the present time.

16. The battery charging method as set forth in claim 4, wherein prior to determining the presently available battery charging current, the battery charging method also comprises:
- obtaining the ideal relationship curve indicating the relationship between the accumulative output energy of the battery and the working time;
- obtaining the historical relationship curve indicating the relationship between the accumulative output energy of the battery and the working time;
- determining a first gradient of the ideal relationship curve corresponding to the present time; and
- determining a second gradient of the historical relationship curve corresponding to the present time.

17. The battery charging method as set forth in claim 5, wherein prior to determining the presently available battery charging current, the battery charging method also comprises:
- obtaining the ideal relationship curve indicating the relationship between the accumulative output energy of the battery and the working time;
- obtaining the historical relationship curve indicating the relationship between the accumulative output energy of the battery and the working time;
- determining a first gradient of the ideal relationship curve corresponding to the present time; and
- determining a second gradient of the historical relationship curve corresponding to the present time.

18. A memory in which multiple instructions are stored, wherein the instructions are loaded by a processor and able to perform the battery charging method as set forth in claim 2.

19. A controller comprising a memory in which multiple instructions are stored and a processor used for carrying out the instructions, wherein the instructions are loaded by the processor to perform the battery charging method as set forth in claim 2.

* * * * *